(12) United States Patent
Toeda et al.

(10) Patent No.: US 12,041,567 B2
(45) Date of Patent: Jul. 16, 2024

(54) USER EQUIPMENT AND RADIO BASE STATION

(71) Applicant: NTT DOCOMO, INC., Tokyo (JP)

(72) Inventors: Teruaki Toeda, Tokyo (JP); Tooru Uchino, Tokyo (JP); Tianyang Min, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 482 days.

(21) Appl. No.: 17/605,451

(22) PCT Filed: Apr. 26, 2019

(86) PCT No.: PCT/JP2019/018028
§ 371 (c)(1),
(2) Date: Oct. 21, 2021

(87) PCT Pub. No.: WO2020/217480
PCT Pub. Date: Oct. 29, 2020

(65) Prior Publication Data
US 2022/0217663 A1    Jul. 7, 2022

(51) Int. Cl.
*H04W 56/00* (2009.01)
(52) U.S. Cl.
CPC .............................. *H04W 56/0015* (2013.01)
(58) Field of Classification Search
CPC .................................................. H04W 56/0015
See application file for complete search history.

(56) References Cited

U.S. PATENT DOCUMENTS

2012/0306691 A1* 12/2012 Werner .................. G01S 19/09
342/357.29

FOREIGN PATENT DOCUMENTS

CN          102083194 A        6/2011

OTHER PUBLICATIONS

Office Action issued in Japanese Application No. 2021-515711 dated Feb. 7, 2023 (5 pages).
International Search Report issued in PCT/JP2019/018028 on Dec. 17, 2019 (1 page).
Written Opinion of the International Searching Authority issued in PCT/JP2019/018028 on Dec. 17, 2019 (3 pages).
Samsung; "Generating and delivering the time reference information in split NG-RAN architecture"; 3GPP TSG-RAN WG3 #103bis, R3-191534; Xi'an, China; Apr. 8-12, 2019 (4 pages).
Samsung; "Reference Timing Delivery for Industrial IOT"; 3GPP TSG-RAN WG2 Meeting #105, R2-1902178; Athens, Greece; Feb. 25-Mar. 1, 2019 (2 pages).

(Continued)

*Primary Examiner* — Brenda H Pham
(74) *Attorney, Agent, or Firm* — Osha Bergman Watanabe & Burton LLP

(57) ABSTRACT

A terminal is disclosed including a transmitting unit that transmits a request signal for requesting a radio base station to transmit a reference time, to the radio base station; and a receiving unit that receives a radio resource control message from the radio base station according to the transmission of the request signal, the radio resource control message including a reference system frame number and the reference time associated with the reference system frame number. In other aspects, radio base stations, a radio communication method, and a radio communication system are also disclosed.

7 Claims, 9 Drawing Sheets

(56) References Cited

OTHER PUBLICATIONS

3GPP TR 23.734 V16.0.0; "3rd Generation Partnership Project; Technical Specification Group Services and System Aspects; Study on enhancement of 5GS for Vertical and LAN Services (Release 16)"; Dec. 2018 (107 pages).
1 Office Action issued in Chinese Application No. 201980095309.4; Dated Aug. 24, 2023 (17 pages).

\* cited by examiner

USER EQUIPMENT AND RADIO BASE STATION

TECHNICAL FIELD

The present invention relates to a user equipment and a radio base station that transmit and receive a reference time.

BACKGROUND ART

The 3rd generation partnership project (3GPP) specifies Long Term Evolution (LTE), and specifies LTE-Advanced (hereinafter, collectively referred to as LTE) for the purpose of further speeding up LTE. In addition, in the 3GPP, specifications of a succession system of the LTE called 5G, New Radio (NR), or the like have been studied.

In the Industrial Internet of things (IIoT), it has been studied that, in order to support Time-Sensitive Networking (TSN), in an NR system, a radio base station (gNB) delivers a reference time applied to at least one of the NR system and the TSN to a user equipment (UE) (see Non Patent Document 1). Thus, the UE can perform time synchronization based on the reference time.

Non Patent Document 1 discusses that the gNB delivers the reference time to the UE using unicast radio resource control (RRC) signaling.

PRIOR ART DOCUMENT

Non-Patent Document

Non Patent Document 1: 3GPP TR 23.734 V16.0.0 3rd Generation Partnership Project; Technical Specification Group Services and System Aspects; Study on enhancement of 5GS for Vertical and LAN Services (Release 16), 3GPP, December 2018

SUMMARY OF THE INVENTION

However, in the 3GPP, a trigger for the gNB to transmit the RRC signaling described above to the UE has not been disclosed at all.

For this reason, there is a possibility that the gNB cannot deliver the reference time using the RRC signaling at a timing when the UE requires the reference time.

Therefore, the present invention has been made in view of such a situation, and an object of the present invention is to provide a user equipment and a radio base station capable of transmitting and receiving a reference time in a predetermined network at a timing when the reference time is required.

A user equipment (100) according to an aspect of the present invention includes: a transmitting unit (101) that transmits a request signal for requesting a radio base station (200) to transmit a reference time in a predetermined network, to the radio base station (200) at a predetermined timing; and a receiving unit (103) that receives a radio resource control (RRC) message from the radio base station (200) according to the transmission of the request signal, the RRC message including a reference system frame number assigned to a radio frame that becomes a reference and including the reference time associated with the reference system frame number.

A radio base station (200) according to an aspect of the present invention includes: a control unit (205) that configures a radio resource control (RRC) message at a predetermined timing, the RRC message including a reference system frame number assigned to a radio frame that becomes a reference and including a reference time in a predetermined network associated with the reference system frame number; and a transmitting unit (201) that transmits the configured RRC message to a user equipment (100).

A radio base station (200) according to an aspect of the present invention includes: a first communication device (230) that performs communication with a user equipment (100); and a second communication device (210) that is connected to the first communication device (230) and performs communication with the user equipment (100) through the first communication device (230), wherein the second communication device (210) includes a transmitting unit (211) that transmits a request signal for requesting the first communication device (230) to transmit a reference time in a predetermined network to the first communication device (230) at a predetermined timing, and the first communication device (230) includes: a receiving unit (233) that receives the request signal; a control unit (235) that configures a radio resource control (RRC) message according to the reception of the request signal, the RRC message including a reference system frame number assigned to a radio frame that becomes a reference and including the reference time in the predetermined network associated with the reference system frame number; and a transmitting unit (231) that transmits the configured RRC message to the user equipment (100).

BRIEF DESCRIPTION OF DRAWINGS

FIG. 2 is an overall schematic configuration diagram of a remote control system 10a.

MODES FOR CARRYING OUT THE INVENTION

Figure 1:
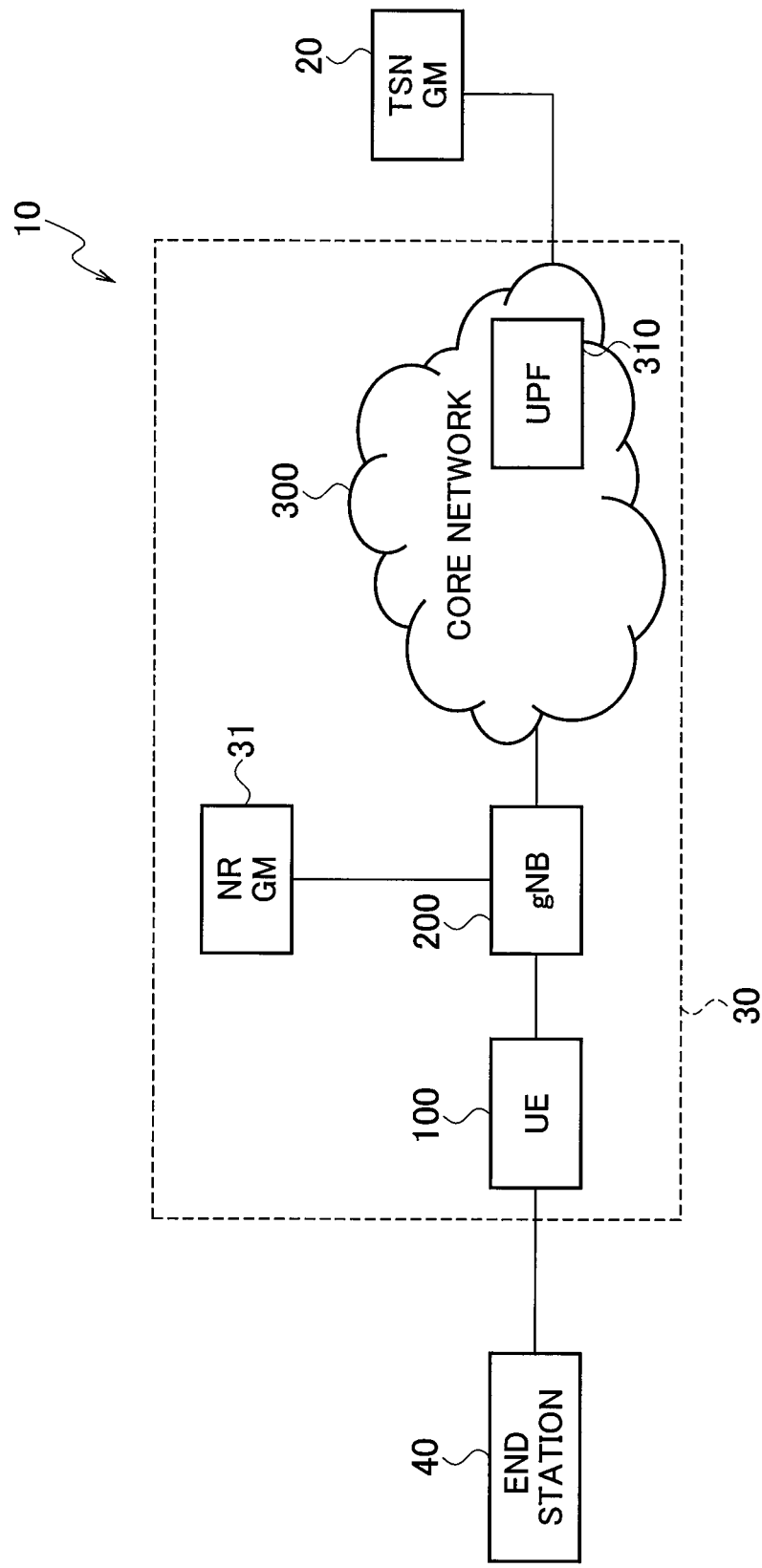
FIG. 1 is an overall schematic configuration diagram of a remote control system 10.

Hereinafter, embodiments will be described with reference to the drawings. Note that the same functions or configurations will be denoted by the same or similar reference numerals, and a description thereof will be appropriately omitted.

(1) Overall Schematic Configuration of Remote Control System

FIG. 1 is an overall schematic configuration diagram of a remote control system 10 according to the present embodiment.

The remote control system 10 includes a TSN grand master (TSN GM) 20, an NR system 30, and an end station 40. In the remote control system 10, a control source (not illustrated) of TSN remotely controls the end station 40 of the TSN in real time through the NR system 30. Note that a specific configuration of the remote control system 10 including the numbers of gNBs and UEs is not limited to an example illustrated in FIG. 1.

The TSN GM 20 oscillates a clock for generating a TSN time with high accuracy. Hereinafter, a time generated based on the clock oscillated by the TSN GM 20 is referred to as a TSN time. The TSN time is a reference time applied in the TSN.

In the remote control system 10, in order to realize remote control in real time, a time used at the control source of the TSN and a time used at the end station 40 need to be matched with the TSN time.

The NR system 30 includes an NR grand master (NR GM) 31, a UE 100, a gNB 200, and a core network 300.

The NR GM 31 oscillates a clock, which is an operation timing of the NR system 30. Hereinafter, a time generated based on the clock oscillated by the NR GM 31 is referred to as an NR time. The NR time is a reference time applied in the NR system 30.

The UE 100 executes radio communication according to NR among the UE 100, the gNB 200, and the core network 300. The UE 100 transmits a request signal for requesting a reference time to the gNB 200. The UE 100 receives unicast RRC signaling including the NR time as the reference time from the gNB 200. The UE 100 performs time synchronization based on the received NR time in order to support the TSN.

The gNB 200 performs radio communication according to the NR between the gNB 200 and the core network 300. The gNB 200 transmits the unicast RRC signaling including the NR time as the reference time to the UE 100. The gNB 200 can perform time synchronization based on the NR time.

The UE 100 and the gNB 200 can support Massive MIMO that generates beams with higher directivity, carrier aggregation (CA) that uses a plurality of component carriers (CCs), dual connectivity (DC) that simultaneously transmits component carriers between a plurality of gNBs and the UE, and the like, by controlling radio signals transmitted from a plurality of antenna elements.

The core network 300 communicates with the UE 100 through the gNB 200. The core network 300 has a user plane function (UPF) 310. The UPF 310 provides a function specialized for U-plane processing.

Figure 2:
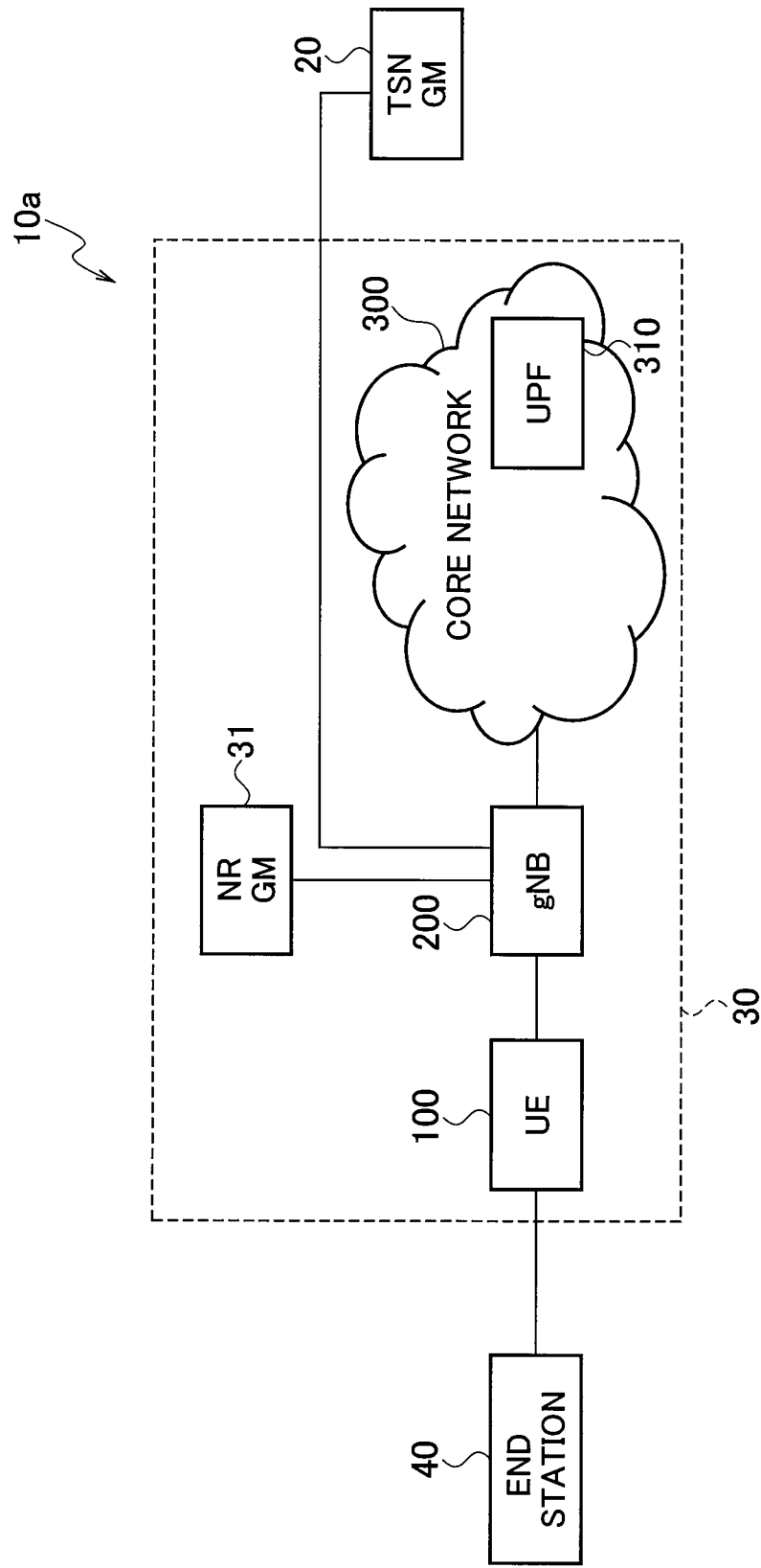

The UPF 310 is connected to the TSN GM 20. Note that, as illustrated in FIG. 2, in a remote control system 10a, the TSN GM 20 may be connected to the gNB 200 instead of the UPF 310. In this case, the gNB 200 can transmit unicast RRC signaling including a TSN time as a reference time to the UE 100. The UE 100 performs time synchronization based on the received TSN time in order to support TSN.

In this case, the gNB 200 can perform time synchronization based on at least one reference time of the NR time and the TSN time.

Note that, in this case, the gNB 200 may transmit unicast RRC signaling including the NR time and the TSN time as the reference times to the UE 100. The UE 100 performs time synchronization based on at least one reference time of the received NR time and TSN time in order to support the TSN.

The end station 40 is a machine (for example, a robot arm) provided in a production plant. The end station 40 receives a command from the control source of the TSN through the NR system 30. The control source of the TSN executes real-time remote control in the remote control system 10 by performing time scheduling for operating the end station 40 based on the TSN time.

(2) Functional Block Configuration of UE

Next, a functional block configuration of the UE 100 will be described. Hereinafter, only portions related to features in the present embodiment will be described. Therefore, the UE 100 includes other functional blocks that are not directly related to the features in the present embodiment.

Figure 3:
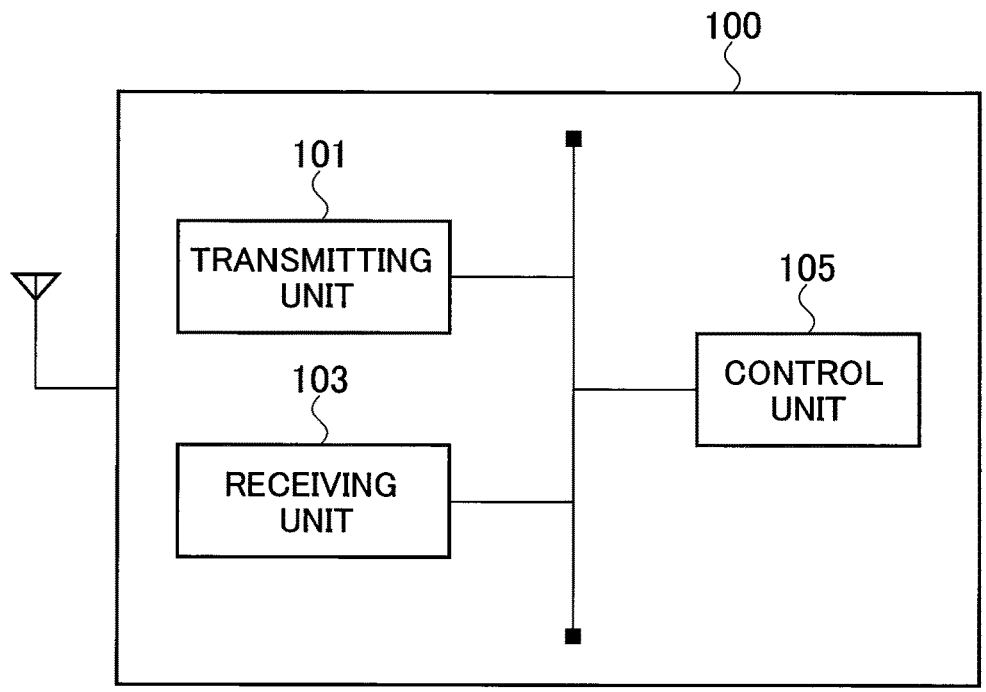
FIG. 3 is a functional block configuration diagram of a UE 100.

FIG. 3 is a functional block configuration diagram of the UE 100. Note that a hardware configuration of the UE 100 will be described later. As illustrated in FIG. 3, the UE 100 includes a transmitting unit 101, a receiving unit 103, and a control unit 105.

The transmitting unit 101 transmits a request signal for requesting the gNB 200 to transmit the reference time to the gNB 200. The receiving unit 103 receives an RRC message from the gNB 200. The control unit 105 detects a timing for transmitting the request signal.

(3) Functional Block Configuration of GNB

Next, a functional block configuration of the gNB 200 will be described. Hereinafter, only portions related to features in the present embodiment will be described. Therefore, the gNB 200 includes other functional blocks that are not directly related to the features in the present embodiment.

Figure 4:
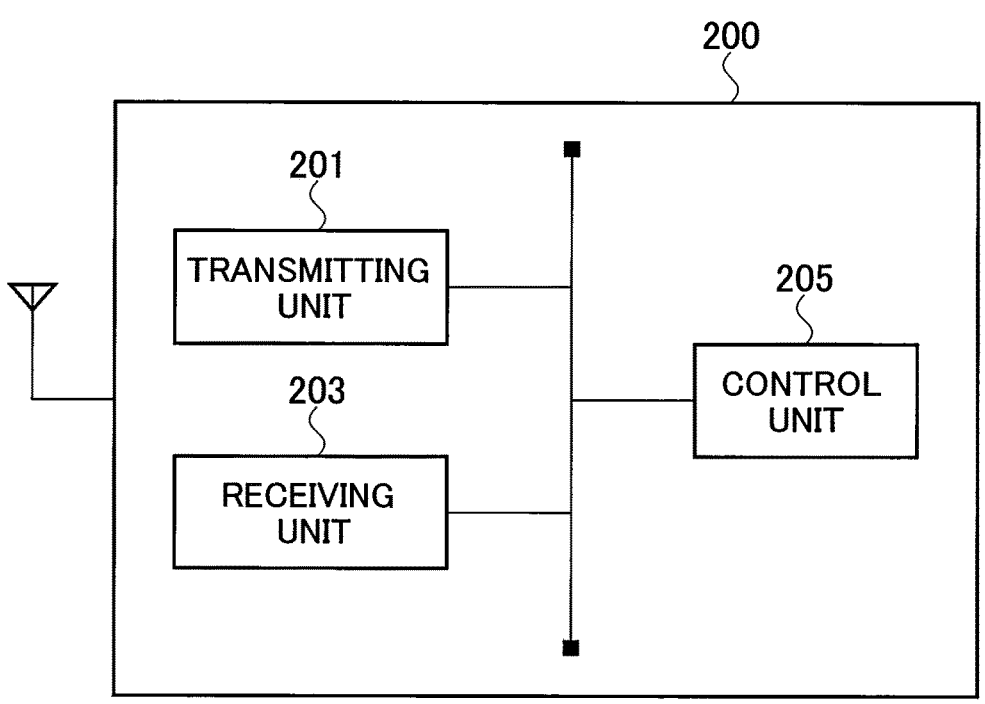
FIG. 4 is a functional block configuration diagram of a gNB 200.

FIG. 4 is a functional block configuration diagram of the gNB 200. Note that a hardware configuration of the gNB 200 will be described later. As illustrated in FIG. 4, the gNB 200 includes a transmitting unit 201, a receiving unit 203, and a control unit 205.

The transmitting unit 201 transmits the RRC message to the UE 100. The receiving unit 203 receives the request signal from the UE 100. The receiving unit 203 receives a notification of a timing for configuring an RRC message from the core network 300. The control unit 205 detects a timing for configuring the RRC message. The control unit 205 configures the RRC message.

(4) Operation of NR System

Next, an operation of the NR system 30 will be described. Specifically, processing in which the gNB 200 delivers the reference time to the UE 100 using the unicast RRC signaling at a predetermined timing will be described. In the present embodiment, the gNB 200 transmits the RRC message as the unicast RRC signaling.

In each delivery processing described later, an information element TimeReferenceInfoList is configured in the RRC message (for example, a DLInformationTransfer message).

A system frame number (reference SFN), which is assigned to a radio frame that becomes a reference, is included in referenceSFN in the information element TimeReferenceInfoList. In addition, an NR time in a gNB-DU 230, which is associated with the reference SFN included in referenceSFN, is included as the reference time in Time in the information element TimeReferenceInfoList.

Here, the reference time included in Time corresponds to the NR time in the gNB-DU 230 at a termination boundary of the SFN included in the reference SFN.

Note that, as illustrated in FIG. 2, in a case where the TSN GM 20 is connected to the gNB 200, at least one reference time of the NR time and the TSN time in the gNB-DU 230 can be included in Time in the information element TimeReferenceInfoList.

(4.1) Delivery Processing 1 of Reference Time by UE Trigger

Figure 5:
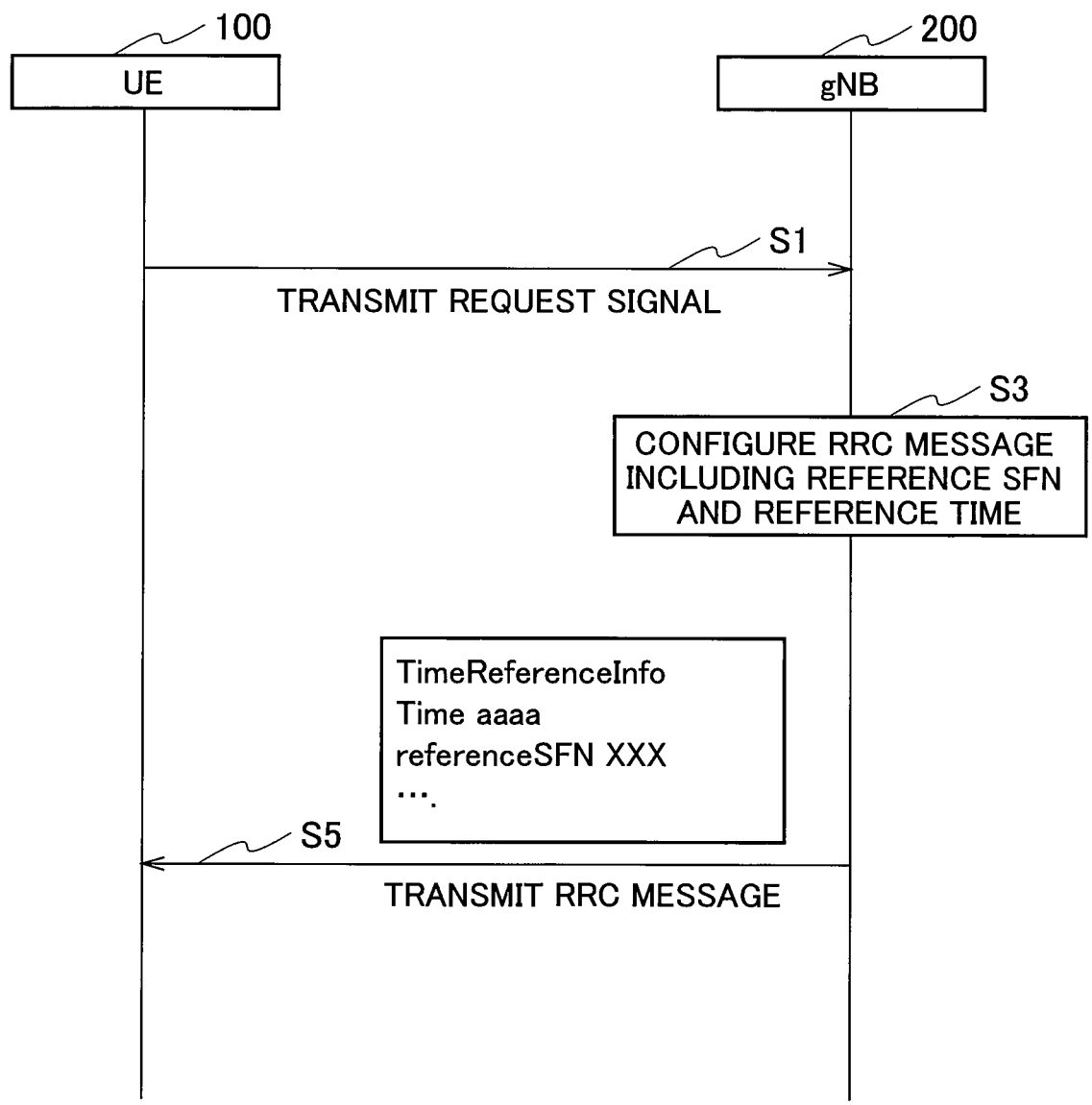
FIG. 5 is a diagram illustrating a sequence of delivery processing of a reference time by a UE trigger.

FIG. 5 is a diagram illustrating a sequence of delivery processing of a reference time by a UE trigger.

The UE 100 transmits a request signal for requesting the gNB 200 to transmit the reference time to the gNB 200 at a predetermined timing (S1).

Examples of the predetermined timing include the following events: a timer, a traffic period, at the time of generation of uplink data, at the time of generation of downlink data, at the time of reception of a paging message, at the time of reception of a trigger from the core network, at the time of detection of a synchronization shift at the NR time or the TSN time within the UE 100, at the time of attach, at the time of RRC state transition, and the like.

With respect to the "timer", for example, in a case where the timer counted in the UE 100 expires, the UE 100 transmits the request signal to the gNB 200.

With respect to "at the time of generation of the downlink data", for example, when the UE 100 detects that the downlink data is generated in the gNB 200, the UE 100 transmits the request signal to the gNB 200.

With respect to "at the time of reception of the trigger from the core network", for example, in a case where the UE 100 receives a transmission instruction from the core network 300 through an NAS layer, the UE 100 transmits the request signal to the gNB 200.

With respect to "at the time of an RRC state transition", for example, in a case where the UE 100 transitions to an RRC connected state, the UE 100 transmits the request signal to the gNB 200.

As such, the UE 100 transmits the request signal to the gNB 200 at the timing when any one of the events described above occurs. Note that the UE 100 may transmit the request signal to the gNB 200 at a timing other than the events described above. In addition, the UE 100 may transmit a content of the event triggering the transmission of the request signal, together with the request signal, to the gNB 200.

The gNB 200 configures an RRC message addressed to the UE 100 according to reception of the request signal. Specifically, the gNB 200 includes the reference SFN in referenceSFN of the information element TimeReferenceInfoList in the RRC message, and includes the reference time associated with the reference SFN in Time of the information element TimeReferenceInfoList (S3).

In the present embodiment, a reference SFN XXX is included in referenceSFN of an information element TimeReferenceInfoList in a DLInformationTransfer message, and a reference time aaaa is included in Time of the information element TimeReferenceInfoList.

The gNB 200 encodes the RRC message, and transmits the encoded RRC message to the UE 100 (S5).

Note that the UE 100 may notify the gNB 200 of an acknowledgment signal (ACK) in a case where the UE 100 receives the RRC message.

(4.2) Delivery Processing of Reference Time by Network Trigger

Next, delivery processing 1 and delivering processing 2 of a reference time by a network trigger will be described.

(4.2.1) Delivery Processing 1

Figure 6:
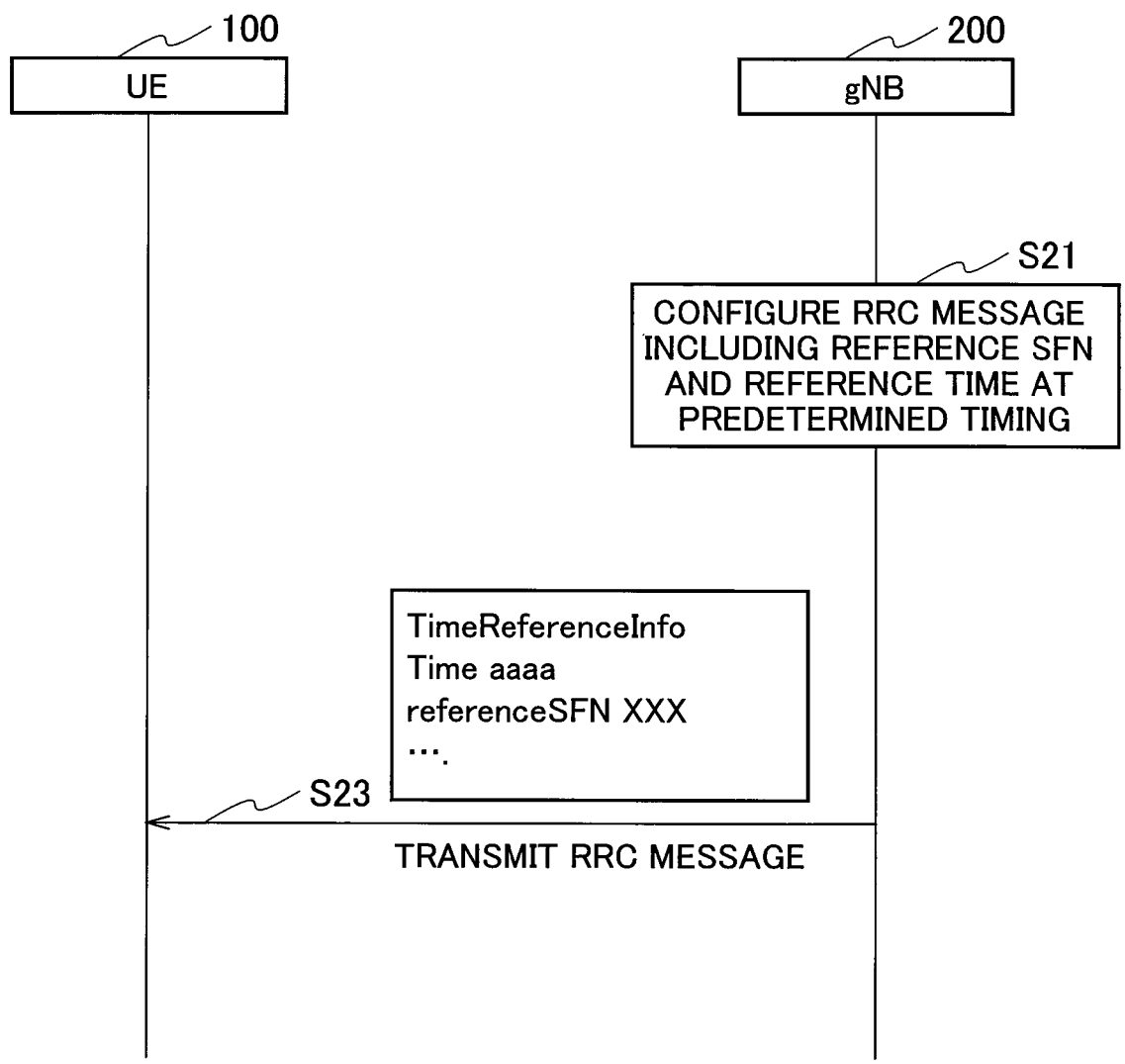
FIG. 6 is a diagram illustrating a sequence of delivery processing 1 of a reference time by a network trigger.

FIG. 6 is a diagram illustrating a sequence of delivery processing 1 of a reference time by a network trigger.

The gNB 200 configures an RRC message addressed to the UE 100 at a predetermined timing. Specifically, the gNB 200 includes a reference SFN in referenceSFN of an information element TimeReferenceInfoList in the RRC message, and includes a reference time associated with the reference SFN in Time of the information element TimeReferenceInfoList (S21).

In the present embodiment, a reference SFN XXX is included in referenceSFN of an information element TimeReferenceInfoList in a DLInformationTransfer message, and a reference time aaaa is included in Time of the information element TimeReferenceInfoList.

Examples of the predetermined timing include the following events: a timer, a traffic period, at the time of generation of uplink data, at the time of generation of downlink data, at the time of transmission of a paging message, at the time of reception of a trigger from the core network, at the time of detection of a synchronization shift at the NR time or the TSN time within the UE 100, at the time of attach, and at the time of RRC state transition (e.g., at the time of transitioning to an RRC connected state).

With respect to the "timer", for example, in a case where the timer counted in the gNB 200 expires, the gNB 200 configures the RRC message.

With respect to "at the time of generation of the uplink data", "at the time of detection of the synchronization shift at the NR time or the TSN time within the UE 100", and "at the time of an RRC state transition", for example, in a case where the gNB 200 detects that these events occur in the UE 100, the gNB 200 configures the RRC message.

With respect to "at the time of transmission of the paging message", "at the time of reception of the trigger from the core network", and "at the time of attach", for example, in a case where the gNB 200 is notified from the core network that these events occur, the gNB 200 configures the RRC message.

As such, the gNB 200 generates the RRC message at the timing when any one of the events described above occurs. Note that the gNB 200 may configure the RRC message at a timing other than the events described above.

The gNB 200 encodes the RRC message, and transmits the encoded RRC message to the UE 100 (S23). In addition, the gNB 200 may transmit a content of the event triggering the transmission of the request signal, together with the RRC message, to the UE 100.

Note that the UE 100 may notify the gNB 200 of an acknowledgment signal (ACK) in a case where the UE 100 receives the RRC message.

(4.2.2) Delivery Processing 2

Since delivery processing 2 of a reference time by a network trigger is performed by a remote control system 10b, the remote control system 10b will be first described.

Figure 7:
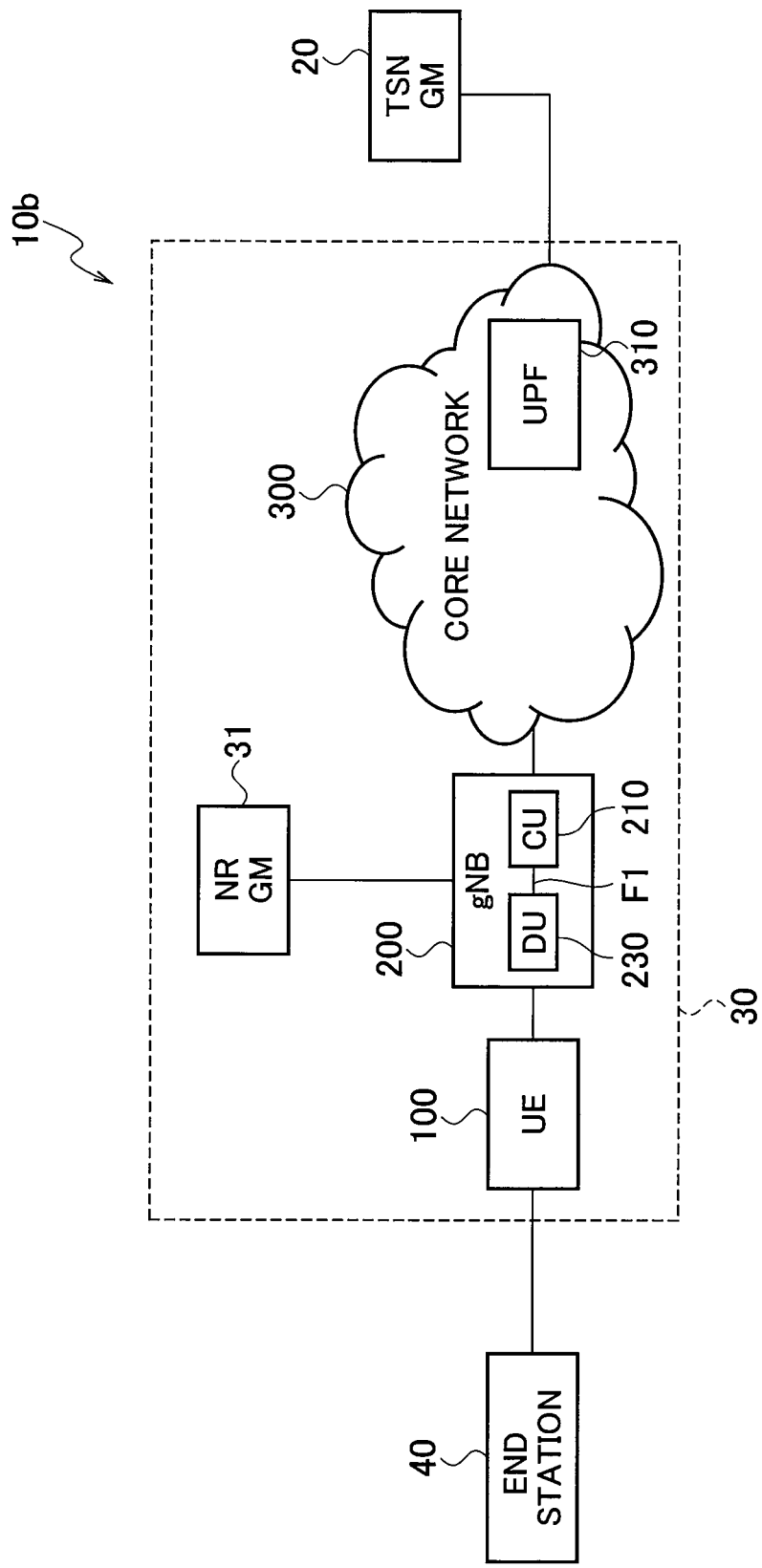
FIG. 7 is an overall schematic configuration diagram of a remote control system 10b.

FIG. 7 is an overall schematic configuration diagram of the remote control system 10b.

In the remote control system 10b, a gNB 200 is separated into a central unit (gNB-CU) 210 and a distributed unit (gNB-DU) 230 that is provided separately and arranged remotely from an installation place of the gNB-CU. In such a configuration, a higher layer having a packet data convergence protocol layer (PDCP) and a layer higher than the PDCP is included in the gNB-CU 210, and a lower layer such as a radio link control layer (RLC) is included in the gNB-DU 230.

The gNB-CU 210 is arranged adjacent to a core network 300, and controls the gNB-DU 230. The gNB-CU 210 may control a plurality of gNB-DUs 230. The gNB-DU 230 is arranged adjacent to a UE 100.

The gNB-CU 210 is connected to the gNB-DU 230 through an F1 interface (for example, an optical fiber). The gNB-CU 210 performs communication with the UE 100 through the gNB-DU 230. Note that a hub, a router and the like can be installed between the gNB-CU 210 and the gNB-DU 230.

In the present embodiment, the gNB-DU 230 constitutes a first communication device executing radio communication with the UE 100. In the present embodiment, the gNB-CU 210 is connected to the gNB-DU 230, and constitutes a second communication device performing communication with the UE 100 through the gNB-DU 230.

Figure 8:
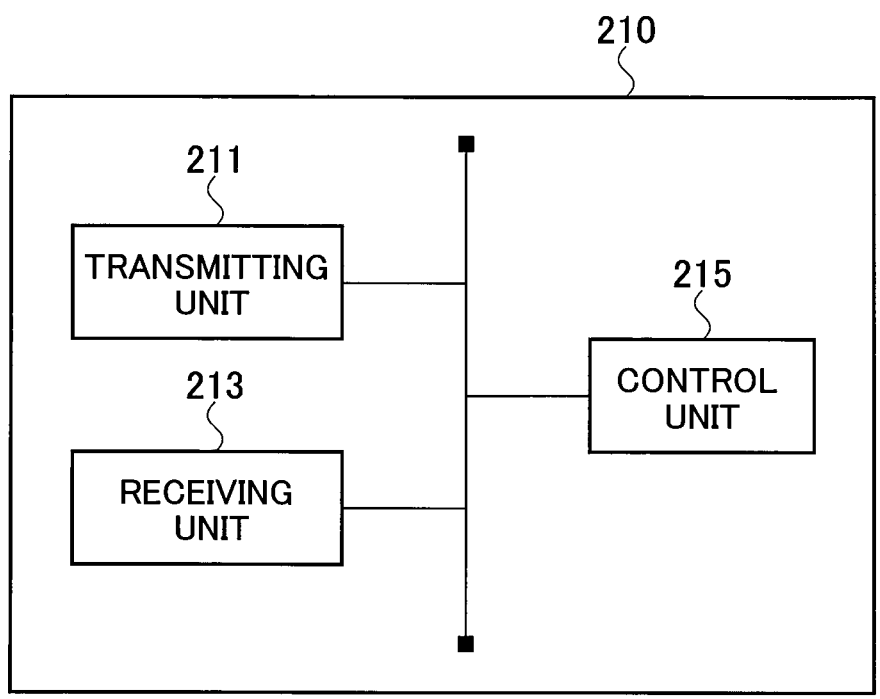
FIG. 8 is a functional block configuration diagram of a gNB-CU 210.

FIG. 8 is a functional block configuration diagram of the gNB-CU 210. Note that a hardware configuration of the gNB-CU 210 will be described later. As illustrated in FIG. 8, the gNB-CU 210 includes a transmitting unit 211, a receiving unit 213, and a control unit 215.

The transmitting unit 211 transmits a request signal for requesting the gNB-DU 230 to transmit a reference time to the gNB-DU 230. The receiving unit 213 receives a notification of a timing for configuring an RRC message from the core network 300. The control unit 215 detects a timing for transmitting the request signal.

Figure 9:
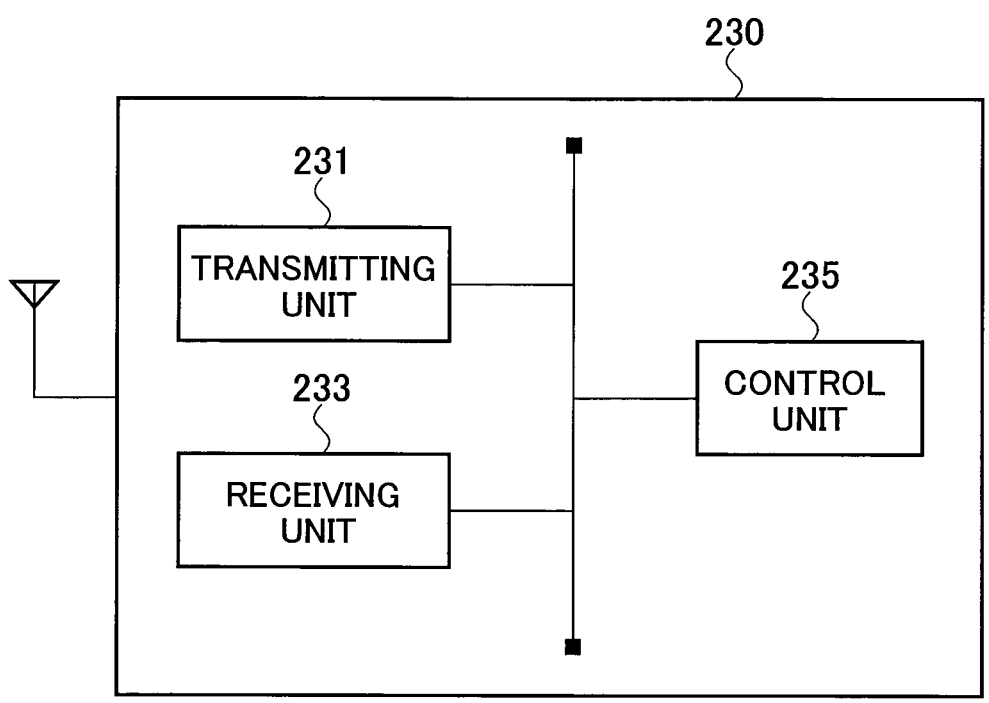
FIG. 9 is a functional block configuration diagram of a gNB-DU 230.

FIG. 9 is a functional block configuration diagram of the gNB-DU 230. Note that a hardware configuration of the gNB-DU 230 will be described later. As illustrated in FIG. 9, the gNB-DU 230 includes a transmitting unit 231, a receiving unit 233, and a control unit 235.

The transmitting unit 231 transmits the RRC message to the UE 100. The receiving unit 233 receives the request signal from the gNB-CU 210. The control unit 235 configures the RRC message.

Figure 10:
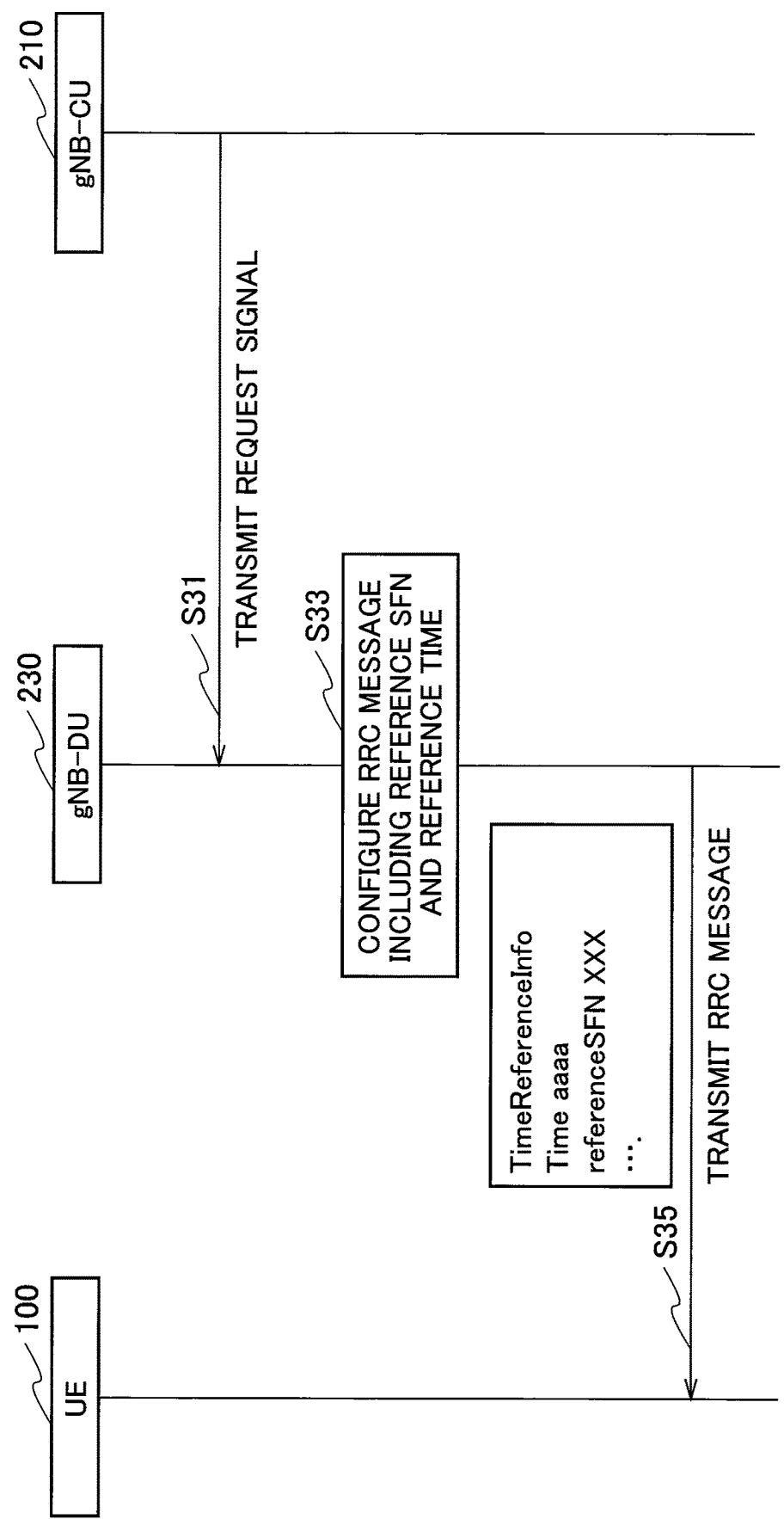
FIG. 10 is a diagram illustrating a sequence of delivery processing 2 of a reference time by a network trigger.

FIG. 10 is a diagram illustrating a sequence of delivery processing 2 of a reference time by a network trigger.

The gNB-CU 210 transmits a request signal for requesting the gNB-DU 230 to transmit the reference time to the gNB-DU 230 at a predetermined timing (S31). As the predetermined timing, the events described in the delivery processing 1 of the reference time by the network trigger are applied.

Note that the gNB-CU 210 may transmit the request signal to the gNB-DU 230 at a timing other than the events described in the delivery processing 1 of the reference time by the network trigger. In addition, the gNB-CU 210 may transmit a content of the event triggering the transmission of the request signal, together with the request signal, to the gNB-DU 230.

The gNB-DU 230 creates an RRC message addressed to the UE 100 according to reception of the request signal. The gNB-DU 230 includes a reference SFN in referenceSFN of an information element TimeReferenceInfoList in the RRC message, and includes a reference time in the gNB-DU 230 associated with the reference SFN in Time of the information element TimeReferenceInfoList (S33).

In the present embodiment, a reference SFN XXX is included in referenceSFN of an information element TimeReferenceInfoList in a DLInformationTransfer message, and a reference time aaaa is included in Time of the information element TimeReferenceInfoList.

The gNB-DU 230 encodes the RRC message, and transmits the encoded RRC message to the UE 100 (S35).

Note that the UE 100 may notify the gNB-CU 210 or the gNB-DU 230 of an acknowledgment signal (ACK) in a case where the UE 100 receives the RRC message.

(5) Action and Effect

According to the embodiment described above, the UE 100 includes the transmitting unit 101 that transmits the request signal for requesting the gNB 200 to transmit the reference time in the predetermined network to the gNB 200 at the predetermined timing, and the receiving unit 103 that receives the RRC message from the gNB 200 according to the transmission of the request signal, the RRC message including the reference SFN assigned to the radio frame that becomes the reference and including the reference time associated with the reference SFN.

With such a configuration, the UE 100 can transmit the request signal for requesting the gNB 200 to transmit the reference time, to the gNB 200. For this reason, the UE 100 can receive the reference time in the predetermined network from the gNB 200 at a timing when the UE 100 requires the reference time.

According to the embodiment described above, the gNB 200 includes the control unit 205 that configures the RRC message at a predetermined timing, the RRC message including the reference SFN assigned to the radio frame that becomes the reference and including the reference time in the predetermined network associated with the reference SFN, and the transmitting unit 101 that transmits the configured RRC message to the UE 100.

With such a configuration, the gNB 200 can configure the RRC message at a timing when the UE 100 requires the reference time. For this reason, the gNB 200 can transmit the reference time in the predetermined network at a timing when the UE 100 requires the reference time.

According to the embodiment described above, the control unit 205 of the gNB 200 configures the RRC message based on the notification from the core network 300.

Also with such a configuration, the gNB 200 can configure the RRC message at a timing when the UE 100 requires the reference time.

According to the embodiment described above, the gNB 200 includes the gNB-DU 230 that performs the communication with the UE 100, and the gNB-CU 210 that is connected to the gNB-DU 230 and performs the communication with the UE 100 through the gNB-DU 230.

The gNB-CU 210 includes the transmitting unit 211 that transmits the request signal for requesting the gNB-DU 230 to transmit the reference time in the predetermined network to the gNB-DU 230 at the predetermined timing.

The gNB-DU 230 includes the receiving unit 233 that receives the request signal, the control unit 235 that configures the RRC message according to the reception of the request signal, the RRC message including the reference SFN assigned to the radio frame that becomes the reference and including the reference time in the predetermined network associated with the reference SFN, and the transmitting unit 231 that transmits the configured RRC message to the UE 100.

Also with such a configuration, the gNB 200 can configure the RRC message at a timing when the UE 100 requires the reference time. For this reason, the gNB 200 can transmit the reference time in the predetermined network at a timing when the UE 100 requires the reference time.

According to the embodiment described above, the transmitting unit 211 of the gNB-CU 210 transmits the request signal to the gNB-DU 230 based on the notification from the core network 300.

Also with such a configuration, the gNB 200 can configure the RRC message at a timing when the UE 100 requires the reference time.

(6) Other Embodiments

Although the contents of the present invention have been described hereinabove with reference to the embodiments, it is obvious to those skilled in the art that the present invention is not limited to these descriptions, and can be variously modified and improved.

The block diagrams (FIGS. 3, 4, 8 and 9) used for describing the embodiments illustrate blocks of functional unit. Those functional blocks (structural components) are realized by a desired combination of at least one of hardware and software. A method for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting is called a transmitting unit or a transmitter. For any of the above, as explained above, the realization method is not particularly limited to any one method.

Figure 11:
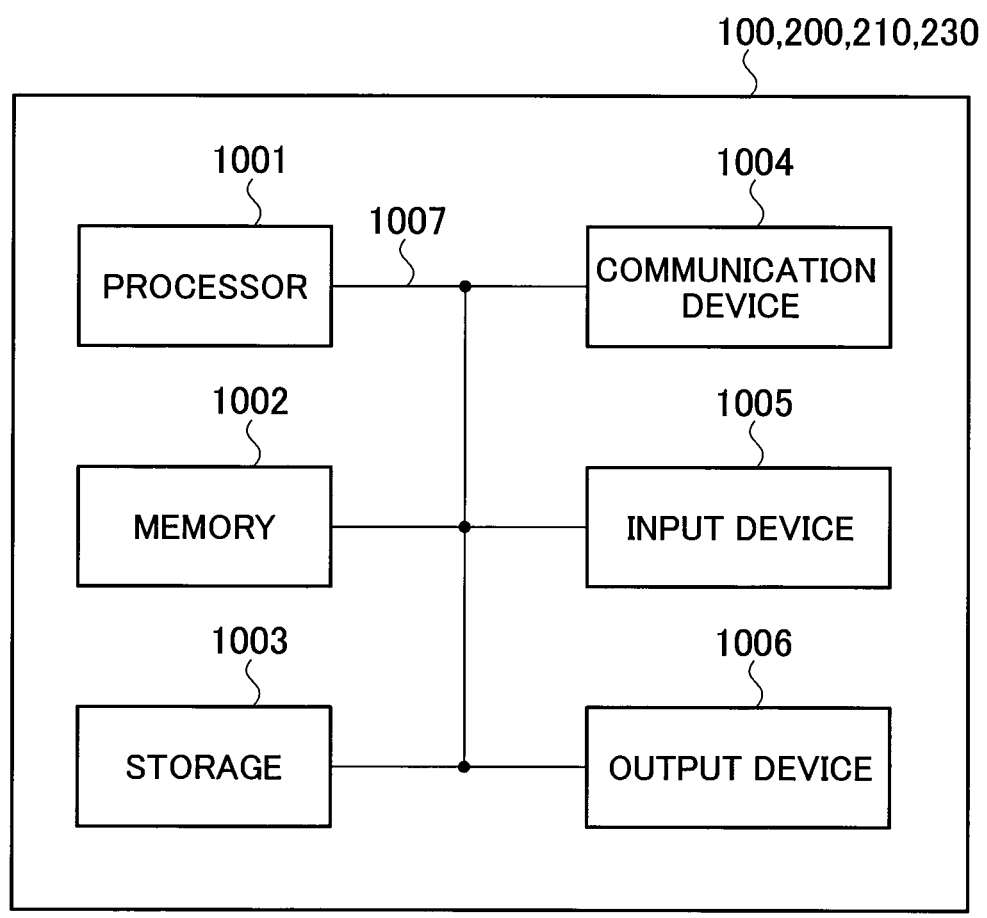
FIG. 11 is a diagram illustrating an example of a hardware configuration of the UE 100, the gNB 200, the gNB-CU 210, and the gNB-DU 230.

Furthermore, the UE 100, the gNB 200, the gNB-CU 210, and the gNB-DU 230 explained above may function as a computer that performs the processing of the radio communication method of the present disclosure. FIG. 11 is a diagram illustrating an example of a hardware configuration of the device. As illustrated in FIG. 11, the device may be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. A hardware configuration of the device may be constituted by including one or plurality of the devices illustrated in the figure, or may be constituted by without including a part of the devices.

The functional blocks of the device are realized by any of hardware elements of the computer device or a desired combination of the hardware elements.

Moreover, the processor 1001 performs operation by loading a predetermined software (program) on hardware such as the processor 1001 and the memory 1002, and realizes various functions of the device by controlling communication via the communication device 1004 and controlling at least one of reading and writing of data on the memory 1002 and the storage 1003.

The processor 1001, for example, operates an operating system to control the entire computer. The processor 1001 may be configured with a central processing unit (CPU) including an interface with a peripheral device, a control device, an operation device, a register, and the like.

Moreover, the processor 1001 reads a program (program code), a software module, data, and the like from at least one of the storage 1003 and the communication device 1004 into the memory 1002, and executes various processing according to them. As the program, a program that is capable of executing on the computer at least a part of the operation explained in the above embodiments, is used. Alternatively, various processing explained above may be executed by one processor 1001 or may be executed simultaneously or sequentially by two or more processors 1001. The processor 1001 may be implemented by using one or more chips. Alternatively, the program may be transmitted from a network via a telecommunication line.

The memory 1002 is a computer readable recording medium and may be configured, for example, with at least one of Read Only Memory (ROM), Erasable Programmable ROM (EPROM), Electrically Erasable Programmable ROM (EEPROM), Random Access Memory (RAM), and the like. The memory 1002 may be called register, cache, main memory (main storage device), and the like. The memory 1002 can store therein a program (program codes), software modules, and the like that can execute the method according to the embodiment of the present disclosure.

The storage 1003 is a computer readable recording medium. Examples of the storage 1003 include at least one of an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 may be called an auxiliary storage device. The recording medium may be, for example, a database including at least one of the memory 1002 and the storage 1003, a server, or other appropriate medium.

The communication device 1004 is hardware (transmission/reception device) capable of performing communication between computers via at least one of a wired network and a wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information therebetween. The bus 1007 may be constituted by a single bus or may be constituted by separate buses between the devices.

Further, the device may be configured to include hardware such as a microprocessor, a digital signal processor (DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), higher layer signaling (for example, RRC signaling, Medium Access Control (MAC) signaling, broadcast information (Master Information Block (MIB), System Information Block (SIB)), other signals, or a combination of these. The RRC signaling may be called RRC message, for example, or may be RRC Connection Setup message, RRC Connection Reconfiguration message, or the like.

Each of the above aspects/embodiments may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information and signals (information and the like) can be output from a higher layer (or lower layer) to a lower layer (or higher layer). It may be input and output via a plurality of network nodes.

The input/output information may be stored in a specific location (for example, a memory) or may be managed in a management table. The information to be input/output can be overwritten, updated, or added. The information may be deleted after outputting. The inputted information may be transmitted to another device.

The determination may be made by a value (0 or 1) represented by one bit or by a Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, optical fiber cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in the present disclosure and terms necessary for understanding the present disclosure may be replaced by terms having the same or similar meanings. For example, at least one of a channel and a symbol may be a signal (signaling). Also, a signal may be a message. Further, a component carrier (CC) may be referred to as a carrier frequency, a cell, a frequency carrier, or the like.

The terms "system" and "network" used in the present disclosure can be used interchangeably.

Furthermore, the information, the parameter, and the like explained in the present disclosure may be represented by an absolute value, may be expressed as a relative value from a predetermined value, or may be represented by corresponding other information. For example, the radio resource may be instructed by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of at least one of a base station and a base station subsystem that perform communication service in this coverage.

In the present disclosure, the terms "mobile station (Mobile Station: MS)", "user terminal", "user equipment (User Equipment: UE)", "terminal" and the like can be used interchangeably.

The mobile station may be called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), or a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same applies). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms such as an uplink channel, a downlink channel, or the like may be read as a side channel.

Likewise, a mobile station in the present disclosure may be read as a base station. In this case, the base station may have the function of the mobile station.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using at least one of one or more wires, cables, and printed electrical connections, and as some non-limiting and non-exhaustive examples, by using electromagnetic energy having wavelengths in the radio frequency region, the microwave region and light (both visible and invisible) regions, and the like.

The reference signal may be abbreviated as RS and may be called pilot according to applicable standards.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as "a", "an", and "the" in English are added, in this disclosure, these articles may include plurality of nouns following these articles.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

INDUSTRIAL APPLICABILITY

According to the user equipment and the radio base station described above, the reference time in the predetermined network can be transmitted and received at a timing when the reference time is required, which is useful.

EXPLANATION OF REFERENCE NUMERALS 10, 10a, 10b Remote control system
20 TSN GM
30 NR system
31 NR GM
40 End station
100 UE
101 Transmitting unit
103 Receiving unit
105 Control unit
200 gNB
201 Transmitting unit
203 Receiving unit
205 Control unit
210 gNB-CU
211 Transmitting unit
213 Receiving unit
215 Control unit
230 gNB-DU
231 Transmitting unit
233 Receiving unit
235 Control unit
300 Core network
310 UPF
1001 Processor
1002 Memory 1003 Storage
1004 Communication device
1005 Input device
1006 Output device
1007 Bus

The invention claimed is:

1. A terminal comprising:
a transmitting unit that transmits a request signal for requesting a radio base station to transmit a reference time, to the radio base station; and
a receiving unit that receives a radio resource control message from the radio base station according to the transmission of the request signal, the radio resource control message including a reference system frame number and the reference time associated with the reference system frame number,
wherein the reference time corresponds to a time at a terminal boundary of a system frame indicated by the reference system frame number.

2. The terminal according to claim 1, wherein the reference time is a reference time applied in a 5G system.

3. The terminal according to claim 1, wherein the radio resource control message is DLInformation Transfer.

4. A radio base station comprising:
a receiving unit that receives a request signal for requesting the radio base station to transmit a reference time, from a terminal;
a control unit that configures a radio resource control message including a reference system frame number and the reference time associated with the reference system frame number, according to the reception of the request signal; and
a transmitting unit that transmits the configured radio resource control message to the terminal, wherein the reference time corresponds to a time at a terminal boundary of a system frame indicated by the reference system frame number.

5. A radio base station comprising:
a first communication device; and
a second communication device that is connected to the first communication device and controls the first communication device, wherein
the second communication device includes a transmitting unit that transmits a request signal for requesting the first communication device to transmit a reference time, to the first communication device, and
the first communication device includes:
a receiving unit that receives the request signal;
a control unit that configures a radio resource control message including a reference system frame number and the reference time associated with the reference system frame number, according to the reception of the request signal; and
a transmitting unit that transmits the configured radio resource control message, wherein the reference time corresponds to a time at a terminal boundary of a system frame indicated by the reference system frame number.

6. A radio communication method comprising:
transmitting, by a terminal, a request signal for requesting a radio base station to transmit a reference time, to the radio base station;
configuring, by the radio base station, a radio resource control message including a reference system frame number and the reference time associated with the reference system frame number, according to the reception of the request signal; and
transmitting, by the radio base station, the configured radio resource control message to the terminal, wherein the reference time corresponds to a time at a terminal boundary of a system frame indicated by the reference system frame number.

7. A radio communication system comprising:
a terminal that transmits a request signal for requesting a transmission of a reference time; and
a radio base station that receives the request signal, wherein
the radio base station includes:
a receiving unit that receives the request signal;
a control unit that configures a radio resource control message including a reference system frame number and the reference time associated with the reference system frame number, according to the reception of the request signal; and
a transmitting unit that transmits the configured radio resource control message to the terminal wherein the reference time corresponds to a time at a terminal boundary of a system frame indicated by the reference system frame number.

* * * * *